United States Patent
Chung et al.

(10) Patent No.: US 9,090,785 B2
(45) Date of Patent: Jul. 28, 2015

(54) SILVER INK COMPOSITION

(75) Inventors: Kwang-Choon Chung, Yongin-si (KR); Hyun Nam Cho, Gunpo-si (KR); Ji Hoon Yoo, Bucheon-si (KR); Dae Sang Han, Seoul (KR)

(73) Assignee: INKTEC CO., LTD., Ansan (KR)

( * ) Notice: Subject to any disclaimer, the term of this patent is extended or adjusted under 35 U.S.C. 154(b) by 0 days.

(21) Appl. No.: 14/112,624

(22) PCT Filed: Apr. 20, 2012

(86) PCT No.: PCT/KR2012/003049
§ 371 (c)(1),
(2), (4) Date: Oct. 18, 2013

(87) PCT Pub. No.: WO2012/144847
PCT Pub. Date: Oct. 26, 2012

(65) Prior Publication Data
US 2014/0026782 A1    Jan. 30, 2014

(30) Foreign Application Priority Data
Apr. 20, 2011 (KR) .................. 10-2011-0036520

(51) Int. Cl.
*C09D 11/52* (2014.01)
*C09D 11/00* (2014.01)

(52) U.S. Cl.
CPC .............. *C09D 11/00* (2013.01); *C09D 11/52* (2013.01)

(58) Field of Classification Search
CPC ..................................... C09D 11/52
USPC .............. 106/31.92; 524/204; 252/514, 520.3
See application file for complete search history.

(56) References Cited

U.S. PATENT DOCUMENTS

| | | | |
|---|---|---|---|
| 7,691,294 B2 | 4/2010 | Chung et al. | |
| 7,955,528 B2 * | 6/2011 | Chung et al. | 252/512 |
| 8,226,755 B2 | 7/2012 | Chung et al. | |
| 8,282,860 B2 | 10/2012 | Chung et al. | |
| 8,679,242 B2 * | 3/2014 | Chung et al. | 106/1.19 |
| 2005/0123621 A1 * | 6/2005 | Burton et al. | 424/618 |
| 2010/0189901 A1 | 7/2010 | Chung et al. | |
| 2010/0261031 A1 | 10/2010 | Chung et al. | |
| 2011/0154948 A1 * | 6/2011 | Chung et al. | 75/345 |
| 2013/0081612 A1 * | 4/2013 | Honda | 126/684 |
| 2014/0179944 A1 * | 6/2014 | Chung et al. | 556/116 |

FOREIGN PATENT DOCUMENTS

| | | |
|---|---|---|
| CN | 101511952 A | 8/2009 |
| KR | 10-2006-0112025 A | 10/2006 |
| KR | 10-2007-0052257 A | 5/2007 |
| KR | 10-2008-0013207 A | 2/2008 |
| KR | 10-2008-0013787 A | 2/2008 |
| TW | 200812730 A | 3/2008 |

OTHER PUBLICATIONS

Taiwan Patent Office, Communication dated Sep. 4, 2014, issued in corresponding Taiwanese Application No. 101114125.
The State Intellectual Property Office of the People'S Republic, Communication dated Apr. 22, 2014, issued in corresponding Chinese Application No. 201280019326.8.

* cited by examiner

*Primary Examiner* — Helene Klemanski
(74) *Attorney, Agent, or Firm* — Sughrue Mion, PLLC

(57) ABSTRACT

The present invention relates to a silver ink composition comprising: silver complexes obtained by reacting one or more silver compounds selected from chemical formula 1 with one or more ammonium carbamate-based compounds or ammonium carbonate-based compounds selected from chemical formula 2 to chemical formula 4; and oxime-based compounds.

8 Claims, No Drawings

SILVER INK COMPOSITION

CROSS REFERENCE TO RELATED APPLICATIONS

This application is a National Stage of International Application No. PCT/KR2012/003049 filed Apr. 20, 2012, claiming priority based on Korean Patent Application No. 10-2011-0036520 filed Apr. 20, 2011, the contents of all of which are incorporated herein by reference in their entirety.

TECHNICAL FIELD

The present invention relates to a silver ink composition, and in particular, to a silver ink composition capable of having excellent stability during ink storage and being sintered at a low temperature to be used on various polymer substrate, and decreasing the sintering time to improve production efficiency.

In addition, the present invention relates to a silver ink composition capable of forming a compact thin film to provide high electrical conductivity, and having an excellent surface uniformity to improve reflectance.

BACKGROUND ART

According to Ullmann's Encyclopedia of Ind. Chem., Vol. A24, 107 (1993), silver is a precious metal which is not easily oxidized and has good electrical and thermal conductivity and catalytic and antibacterial activity, and thus silver and silver compounds are widely used in the industries of silver alloys, plating, medicines, photographs, electric and electronic products, fibers, detergents, household appliances, etc. In addition, the silver compound may be used as a catalyst for synthesizing an organic material and polymer. Specifically, a lead usage is restricted, and a metal pattern is required in new fields such as a low resistance metal wiring, a printed circuit board (PCB), a flexible circuit board (FPC), a RFID tag antenna, an electromagnetic shielding, plasma display (PDP), a liquid crystal display (TFTLCD), an organic light emitting diode (OLED), a flexible display, an organic thin film transistor (OTFT), or the like, or the silver is used as an electrode, or the like, in an electrical and electronic component circuit such that an recent interest in the silver has been increased.

In the case of using the silver, a silver paste prepared by containing a nanoparticle, powder, or flake-typed silver, and a binder resin or a solvent may be directly used, or various types of silver and organic silver compounds prepared by reacting a silver compound such as silver nitrate with other compounds in an aqueous solution or an organic solvent to thereby form colloid or fine particles may be used. The organic silver compound is used for forming metal patterns by various methods such as chemical vapor deposition (CVD), plasma deposition, sputtering, electroplating, photolithography, electron beam, laser, or the like.

Carboxylate is well known as a ligand of an organic metal complex among the organic silver compounds (see Prog. Inorg. Chem., 10, p. 233 (1968)). In general, since metal carboxylate complexes including silver are susceptible to light, less soluble in organic solvents (see J. Chem. Soc., (A)., p. 514 (1971), U.S. Pat. No. 5,534,312) and are discomposed at high temperature, they are limited in the application thereof in spite of easiness in preparation thereof.

Several methods have been proposed to solve this problem in J. Inorg. Nucl. Chem., 40, p. 1599 (1978), Ang. Chem., Int. Ed. Engl., 31, p. 770 (1992), Eur. J. Solid State Inorg. Chem., 32, p. 25 (1995), J. Chem. Cryst., 26, p. 99 (1996), Chem. Vapor Deposition, 7, 111 (2001), Chem. Mater., 16, 2021 (2004), U.S. Pat. No. 5,705,661, and Korean Patent Laid-Open Publication No. 2003-0085357. For example, a method of using compounds containing a long alkyl chain in a carboxylic acid or using an amine compound or a phosphine compound may be proposed. However, the kind of derivatives of a compound derived from the silver is restricted so far, and further the derivatives lack stability and solubility and have high decomposition temperature and low decomposition rate for forming patterns of a metal, and thus, various substances therefor can not be used.

The present inventors have presented a stable and highly soluble complex compound and a preparation method thereof as described in Korean Patent Application Nos. 2005-11475 and 2005-11478. However, in order to use the metal pattern as described above to successfully manufacture various application products, a high degree of ink composition is required.

Therefore, the inventors of the present invention have done their efforts in order to solve this problem, and as a result successfully reached the present invention.

Technical Problem

An object of the present invention is directed to providing a silver ink composition having excellent stability during ink storage, allowing low-temperature sintering to thereby be usable on various polymer substrates, and decreasing sintering time to thereby improve production efficiency.

Another object of the present invention is directed to providing a silver ink composition capable of forming a compact thin film to thereby provide high electrical conductivity, and having an excellent surface uniformity to improve reflectance.

Technical Solution

In one general aspect, the present invention provides a silver ink composition capable of having excellent stability during ink storage, allowing low-temperature sintering, and decreasing the sintering time, by adding an oxime-based compound as a reducing agent into a silver complex compound.

Specifically, the present invention provides a silver ink composition including a silver complex compound obtained by reacting at least one silver compound represented by Chemical Formula 1 with at least one ammonium carbamate- or ammonium carbonate-based compound represented by Chemical Formula 2, 3, or 4, and the oxime-based compound.

Advantageous Effects

According to the present invention, there is provided a silver ink composition capable of having excellent stability during ink storage, allowing low-temperature firing to thereby be usable on various polymer substrates, allowing formation of a compact thin film to thereby provide high electrical conductivity, having excellent surface uniformity to thereby improve reflectance, and decreasing a firing time to thereby improve production efficiency.

BEST MODE

The present invention provides a silver ink composition capable of having excellent stability during ink storage, allowing low-temperature sintering, and decreasing the sintering time, by adding an oxime-based compound as a reducing agent into a silver complex compound.

Specifically, the silver ink composition according to the present invention includes the silver complex compound obtained by reacting at least one silver compound represented by Chemical Formula 1 below with at least one ammonium carbamate- or ammonium carbonate-based compound represented by Chemical Formula 2, 3, or 4, and includes an oxime-based compound.

[Chemical Formula 1]

Ag$_n$X

[Chemical Formula 2]

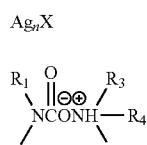

[Chemical Formula 3]

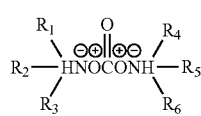

[Chemical Formula 4]

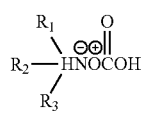

In Chemical Formula 1, n is an integer from 1 to 4, and X is selected from the group consisting of oxygen, sulfur, halogen, cyano, cyanate, carbonate, nitrate, nitrite, sulfate, phosphate, thiocyanate, chlorate, perchlorate, tetrafluoroborate, acetylacetonate, carboxylate, and the like. Specifically, examples thereof may include silver oxide, silver thiocyanate, silver sulfate, silver chloride, silver cyanide, silver cyanate, silver carbonate, silver nitrate, silver nitrite, silver sulfide, silver phosphate, silver perchlorate, silver tetrafluoroborate, silver acetylacetonate, silver acetate, silver lactate, silver oxalate and derivatives thereof, but are not limited thereto. In the present invention, silver oxide or silver carbonate is more preferable in view of reactivity or post treatment.

In addition, in Chemical Formula 2, 3 or 4, $R_1$, $R_2$, $R_3$, $R_4$, $R_5$ and $R_6$ may be the same or different from each other, and each of these may be selected from hydrogen; a C1 to C30 aliphatic alkyl group; a C1 to C30 aliphatic aryl group; a C1 to C30 cycloaliphatic alkyl group; a C1 to C30 cycloaliphatic aryl group; a C1 to C30 aralkyl group which is a mixture of C1 to C30 aliphatic alkyl group, a C1 to C30 aliphatic aryl group, a C1 to C30 cycloaliphatic alkyl group, and a C1 to C30 cycloaliphatic aryl group; an alkyl group having a substituted functional group; an aryl group having a substituted functional group; a heterocyclic compound; a polymer compound; and derivatives thereof; but is not particularly limited thereto.

Specific examples thereof may include hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docosane, cyclopropyl, cyclopentyl, cyclohexyl, allyl, hydroxy, methoxy, hydroxyethyl, methoxyethyl, 2-hydroxypropyl, methoxypropyl, cyanoethyl, ethoxy, butoxy, hexyloxy, methoxyethoxyethyl, methoxyethoxy-ethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tolyl, benzyl and derivatives thereof, polymer compounds such as polyallylamine, or polyethyleneimine, or the like, and derivatives thereof, or the like, but are not particularly limited thereto. Specific examples of the compound may include ammonium carbamate, ammonium carbonate, ammonium bicarbonate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneimineammonium hexamethyleneiminecarbamate, morpholinium morpholinecarbamate, pyridinium ethylhexylcarbamate, triethylenediaminium isopropylbicarbamate, benzylammonium benzylcarbamate, triethoxysilylpropylammonium triethoxysilylpropylcarbamate, ethylammonium ethylcarbonate, isopropylammonium isopropylcarbonate, isopropylammonium bicarbonate, n-butylammonium n-butylcarbonate, isobutylammonium isobutylcarbonate, t-butylammonium t-butylcarbonate, t-butylammonium bicarbonate, 2-ethylhexylammonium 2-ethylhexylcarbonate, 2-ethylhexylammonium bicarbonate, 2-methoxyethylammonium 2-methoxyethylcarbonate, 2-methoxyethylammonium bicarbonate, 2-cyanoethylammonium 2-cyanoethylcarbonate, 2-cyanoethylammonium bicarbonate, octadecylammonium octadecylcarbonate, dibutylammonium dibutylcarbonate, dioctadecylammonium dioctadecylcarbonate, dioctadecylammonium bicarbonate, methyldecylammonium methyldecylcarbonate, hexamethyleneimineammonium hexamethyleneiminecarbonate, morpholineammonium morpholinecarbonate, benzylammonium benzylcarbonate, triethoxysilylpropylammonium triethoxysilylpropylcarbonate, piridinium bicarbonate, triethylenediaminium isopropylcarbonate, triethylenediaminium bicarbonate, derivatives thereof, and the like.

Meanwhile, it is not necessary to limit the kinds of the ammonium carbamate- or ammonium carbonate-based compound and the preparation method thereof. For example, as disclosed in U.S. Pat. No. 4,542,214, an ammonium carbamate-based compound may be obtained from primary amine, secondary amine, tertiary amine or a mixture thereof and carbon dioxide; an ammonium carbonate-based compound may be obtained when 0.5 mole of water is used per 1 mole of amine; and an ammonium bicarbonate-based compound may be obtained when 1 mole or more of water is used per 1 mole of amine. The preparation method of ammonium carbamate or ammonium carbonate may be performed under normal pressure or applied pressure without a specific solvent, or in the presence of such solvent as water, alcohols like methanol, ethanol, isopropanol, 1-methoxypropanol, and butanol, glycols like ethylene glycol and glycerine, acetates like ethyl acetate, butyl acetate and carbitol acetate, ethers like diethyl ether, tetrahydrofuran and dioxane, ketones like methylethylketone and acetone, hydrocarbons like hexane and heptane, aromatic solvents like benzene and toluene, halogen-substituted solvents like chloroform, methylene chloride and carbon tetrachloride, acetonitrile, or a mixed solvent thereof. The carbon dioxide may be bubbled in gas phase or used in the form of dry ice in solid phase, and reacted even in the supercritical phase. In addition to the above methods, other known methods may be applied in the preparation of the derivatives of ammonium carbamate and ammonium carbonate used in the present invention, as long as the final structure is the same. That is, solvent, reaction temperature, concentration, catalyst, or the like, is not particularly limited in the preparation thereof. In addition, the preparation yield is not particularly limited.

The ammonium carbamate- or ammonium carbonate-based compound prepared as described above may be reacted with the silver compound to prepare an organic silver complex compound. For example, at least one silver compound represented by Chemical Formula 1, at least one ammonium carbamate- or ammonium carbonate derivative represented by Chemical Formula 2, 3 or 4, and a mixture thereof are reacted with each other under nitrogen atmosphere at normal pressure or applied pressure without a solvent or in the presence of such solvent as water, alcohols like methanol, ethanol, isopropanol and butanol, glycols like ethylene glycol and glycerine, acetates like ethyl acetate, butyl acetate and carbitol acetate, ethers like diethyl ether, tetrahydrofuran and dioxane, ketones like methylethylketone and acetone, hydrocarbons like hexane and heptane, aromatic solvents like benzene and toluene and halogen-substituted solvents like chloroform, methylene chloride and carbon tetrachloride or a mixture thereof. In addition, in preparing the silver complex compound, the silver compound represented by Chemical Formula 1 and at least one amine compound are mixed together to prepare a solution, and the solution is reacted with carbon dioxide to obtain the silver complex compound. Even in the case, the reaction may also be performed under normal pressure or applied pressure without a solvent or in the presence of a solvent. However, the preparation method of the organic silver complex compound of the present invention is not particularly limited. That is, any known method can be applied as long as the final structure is the same. For example, solvent, reaction temperature, concentration, catalyst, or the like, is not particularly limited in the preparation thereof, and the preparation yield is not particularly limited thereto.

Meanwhile, an oxime-based compound as a reducing agent may be added in the silver ink composition of the present invention, where the oxime-based compound may be represented by Chemical Formula 5 below.

When the oxime-based compound is added as the reducing agent, the sintering process may be performed at a low temperature of 100° C. or lower in a short time.

[Chemical Formula 5]

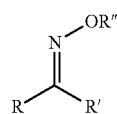

In chemical Formula 5,
R, R', and R" may be the same as or different from each other, and each may be selected from the group consisting of hydrogen; a C1 to C30 aliphatic alkyl group; a C1 to C30 aliphatic aryl group; a C1 to C30 cycloaliphatic alkyl group; a C1 to C30 cycloaliphatic aryl group; a C1 to C30 aralkyl group which is a mixture of C1 to C30 aliphatic alkyl group, a C1 to C30 aliphatic aryl group, a C1 to C30 cycloaliphatic alkyl group, and a C1 to C30 cycloaliphatic aryl group; an alkyl group having a substituted functional group; an aryl group having a substituted functional group; a heterocyclic compound; a polymer compound; and derivatives thereof. These are preferable examples, but the scope of the present invention is not limited thereto.

Examples of the oxime-based compound may include acetone oxime (Table 1), cyclohexanone oxime (Table 1), 2-butanone oxime (Table 1), 2,3-butanedione monoxime (Table 1), dimethylglyoxime (Table 1), methyl acetoacetate monoxime (Table 1), methyl pyruvate monoxime (Table 1), benzaldehyde oxime, 1-indanone oxime, 2-adamantanone oxime, 2-methylbenzamide oxime, 3-methylbenzamide oxime, 4-methylbenzamide oxime, 3-aminobenzamide oxime, 4-aminobenzamide oxime, acetophenone oxime, benzamide oxime, and pinacolone oxime, but are not limited thereto.

TABLE 1

| NO | oxime-based compound | Structure Formula |
|----|----------------------|-------------------|
| 1 | Acetone oxime | |
| 2 | Cyclohexanone oxime | |
| 3 | 2-butanone oxime | |
| 4 | 2,3-butanedione monoxime | |
| 5 | Dimethylglyoxime | |
| 6 | Methyl acetoacetate monoxime | |
| 7 | Methyl pyruvate monoxime | |

[Reaction Scheme 1]

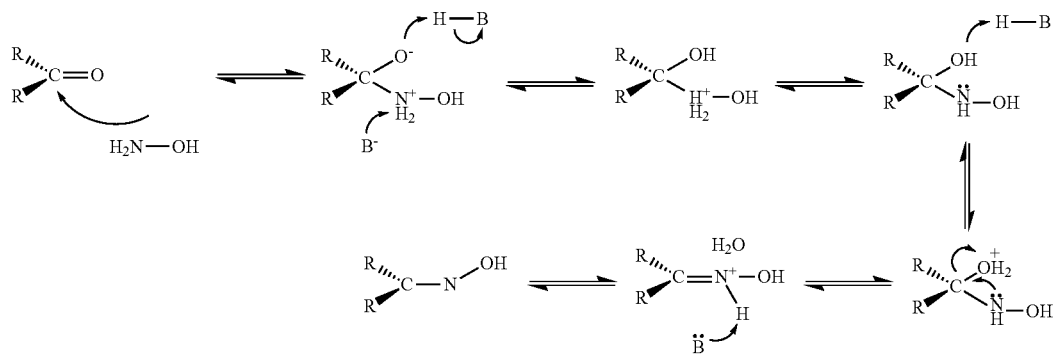

As seen in Reaction Scheme 1 showing an oxime mechanism, a reversible reaction of ketone or aldehyde and hydroxylamine occurs in the presence of acid or base, to produce ketoxime or aldoxime. When a heat is applied thereto, oxime is decomposed.

As described above, when the silver ink composition using the silver complex compound and the oxime-based compound as the reducing agent is sintered at a temperature of 80° C. or higher, the oxime-based compound is decomposed to produce ketone or aldehyde that can reduce the silver complex compound, and thus the silver complex compound is reduced.

In addition, when the oxime-based compound is added as the reducing agent, the silver complex compound may maintain stability such that it can not be reduced for 48 hours or more. In addition, a thin film manufactured using the silver ink composition has a significantly compact structure, such that electrical properties such as electrical conductivity and the like, and physical properties are significantly improved, and has excellent surface uniformity to thereby improve reflectance thereof.

Since the oxime-based compound is stable at room temperature when mixing with the silver complex compound, the amount of the oxime-based compound may be added in a large amount based on silver weight. The oxime-based compound may be activated as a reducing agent at a low temperature, for example, 80° C. or higher. A large amount of the reducing agent proceeds the reduction reaction based on the weight of silver, and thus silver may be reduced in a short time unlike the other reducing agents.

Meanwhile, the oxime-based compound may be preferably added in an amount of 0.001 to 60 wt % and more preferably, 0.1 to 50 wt %, based on 100 wt % of the silver ink composition. When the content of the oxime-based compound is significantly small, the compound may not serve as a reducing agent, and thus, it is difficult to lower sintering temperature.

Meanwhile, the silver ink composition according to the present invention may further include at least one selected from the group consisting of solvent, binder resin, surfactant, wetting agent, thixotropic agent, leveling agent, dispersing agent, stabilizer, and coupling agent.

In the case of the solvent, the solvent is required in order to control viscosity of an ink or smoothly form a thin film. As the solvent usable herein, water, alcohols like methanol, ethanol, isopropanol, butanol, ethylhexyl alcohol and terpineol, glycols like ethylene glycol and glycerine, acetates like ethyl acetate, butyl acetate, methoxypropylacetate, carbitolacetate, and ethylcarbitolacetate, ethers like methylcellosolve, butylcellosolve, diethylether, tetrahydrofuran and dioxane, ketones like methylethylketone, acetone, dimethylformamide, and 1-methyl-2-pyrrolidone, and hydrocarbons like hexane, heptane, paraffin oil, and mineral spirit, aromatic solvents like benzene and toluene, halogen-substituted solvents like chloroform, methylene chloride and carbon tetrachloride, dimethylsulfoxide or a mixed solvent thereof, may be used.

As the stabilizer, primary amine, secondary amine, or tertiary amine compound, or, an ammonium carbamate-, carbonate-, or bicarbonate-based compound, or at least one mixture thereof, may be used.

That is, specific examples of the amine compound as the stabilizer may include methylamine, ethylamine, n-propylamine, isopropylamine, n-butylamine, isobutylamine, isoamylamine, n-hexylamine, 2-ethylhexylamine, n-heptylamine, n-octylamine, isooctylamine, nonylamine, decylamine, dodecylamine, hexadecylamine, octadecylamine, docosaneamine, cyclopropylamine, cyclopentylamine, cyclohexylamine, allylamine, hydroxyamine, ammoniumhydroxide, methoxyamine, 2-ethanolamine, methoxyethylamine, 2-hydroxypropylamine, methoxypropylamine, cyanoethylamine, ethoxyamine, n-butoxyamine, 2-hexyloxyamine, methoxyethoxyethylamine, methoxyethoxyethoxyethylamine, diethylamine, dipropylamine, diethanolamine, hexamethyleneimine, morpholine, piperidine, piperazine, ethylenediamine, propylenediamine, hexamethylenediamine, triethylenediamine, 2,2-(ethylenedioxy)bisethylamine, triethylamine, triethanolamine, pyrrole, imidazole, pyridine, aminoacetaldehyde dimethyl acetal, 3-aminopropyltrimethoxysilane, 3-aminopropyltriethoxysilane, aniline, anisidine, aminobenzonitrile, benzylamine and derivatives thereof, and polymer compounds like polyallylamine and polyethyleneimine and derivatives thereof, but are not particularly limited thereto.

Specific examples of the ammonium carbamate-, carbonate-, or bicarbonate-based compound as the stabilizer may include ammonium carbonate, ammonium bicarbonate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneimineammonium hexamethyleneiminecarbamate, morpholineammonium morpholinecarbamate, pyridinium ethylhexylcarbamate, triethylenediaminium isopropylbicarbamate, benzylammonium benzylcarbamate, triethoxysilylpropylammonium triethoxysilylpropylcarbamate, ethylammonium ethylcarbonate, isopropylammonium isopropylcarbonate, isopropylammonium bicarbonate, n-butylammonium n-butylcarbonate, isobutylammonium isobutylcarbonate, t-butylammonium t-butylcarbonate, t-butylammonium bicarbonate, 2-ethylhexylammonium 2-ethylhexylcarbonate, 2-ethylhexylammonium bicarbonate, 2-methoxyethylammonium 2-methoxyethylcarbonate, 2-methoxyethylammonium bicarbonate, 2-cyanoethylammonium 2-cyanoethylcarbonate, 2-cyanoethylammonium bicarbonate, octadecylammonium octadecylcarbonate, dibutylammonium dibutylcarbonate, dioctadecylammonium dioctadecylcarbonate, dioctadecylammonium bicarbonate, methyldecylammonium methyldecylcarbonate, hexamethyleneimineammonium hexamethyleneiminecarbonate, morpholineammonium morpholinecarbonate, benzylammonium benzylcarbonate, triethoxysilylpropylammonium triethoxysilylpropylcarbonate, piridinium bicarbonate, triethylenediaminium isopropylcarbonate, triethylenediaminium bicarbonate, derivatives thereof, or the like. The usage amount of the stabilizer does not need to be particularly limited as long as the amount is sufficient for ink characteristics of the present invention. However, the content of the stabilizer may have a molar ratio of 0.1% to 90%, preferably 1% to 50%, more preferably 5% to 30%. When the content thereof is more than the afore-mentioned range, conductivity of the thin film may be lowered, and when the content thereof is less than the afore-mentioned range, storage stability of the ink may be deteriorated. As a result, the lowered storage stability of the ink may cause problem of film. In addition, if the content of the stabilizer is out of the afore-mentioned range, the film obtained by coating and sintering the silver ink composition may not be uniform and compact, resulting in cracks therein.

As the binder resin, an acryl based resin such as polyacrylic acid and polyacrylic acid ester, a cellulose based resin such as ethyl cellulose, an aliphatic or copolymer polyester based resin, a vinyl based resin such as polyvinylbutyral and polyvinylacetate, a polyurethane resin, a polyether resin, a urea resin, an alkyd resin, a silicone resin, a fluorine resin, an olefin based resin such as polyethylene, a thermoplastic resin such as petroleum and rosin based resin, an epoxy based resin, an unsaturated polyester based resin, a phenol based resin, a thermosetting resin such as melamine, an acryl based resin hardened by UV or electron beam, ethylene-propylene based rubber, styrene-butadiene based rubber, or the like may be used alone or together.

Examples of the surfactant may include an anionic surfactant such as sodium lauryl sulfate, a nonionic surfactant such as nonylphenoxypolyethoxyethanol and FSN from Dupont, a cationic surfactant such as laurylbenzylammonium chloride or an amphoteric surfactant such as lauryl betaine and coco betaine.

Examples of the wetting agent or wetting-dispersing agent may include polyethylene glycol, Surfynol series from Air Product Inc. or TEGO Wet series from Degussa Inc. Also, examples of the thixotropic agent or leveling agent may include BYK series from BYK Inc., Glide series from Degussa Inc., EFKA 3000 series from EFKA Inc., DSX series from Cognis Inc., or the like. In addition, besides the method described above, the silver ink composition may be obtained by preparing the silver compound represented by Chemical Formula 1, excessive amount of at least one ammonium carbamate- or ammonium carbonate-based compound, and a mixed solution thereof, and if necessary, adding the binder, additive, or the like, thereto, and then reacting it with carbon dioxide. Here, this reaction may also be performed under normal pressure or applied pressure without a solvent or in the presence of a solvent.

Meanwhile, the ink composition prepared in the present invention has superior stability and solubility and thus can be easily applied to coating or various printing processes. For example, the ink composition may be coated on a substrate such as metal, glass, silicon wafer, ceramic, plastic film like polyester or polyimide, rubber sheet, fiber, wood, paper, or the like to thereby form a thin film, or directly printed thereon. The substrate may be used after washing and degreasing thereof, or may be particularly subjected to pre-treatment. Examples of the pre-treatment method may include plasma treatment, ion beam or corona treatment, oxidation or reduction, heating, etching, UV radiation, primer treatment using the binder or additive, or the like. The thin film forming or printing method may be performed by at least one selected from spin coating, roll coating, spray coating, dip coating, flow coating, doctor blade and dispensing, ink-jet printing, offset printing, screen printing, pad printing, gravure printing, flexography, lithography, or the like, depending on the physical properties of the ink.

The viscosity of the silver ink of the present invention does not need to be particularly limited. That is, the viscosity of the ink of the present invention is not particularly limited as long as the thin film forming or printing method is not negatively affected. Although the viscosity thereof may vary depending on the preparation method and particular kind of the ink, the range thereof is preferably 0.1 to 200,000 cps and more preferably 1 to 10,000 cps. The viscosity of the ink becomes an important factor when film or pattern formation is performed by ink-jet printing in the printing methods as described above. In such case, the range of the viscosity thereof is 0.1 to 50 cps, preferably 1 to 20 cps, and more preferably 2 to 15 cps. If the viscosity thereof is smaller than the range as described above, conductivity of the film may be decreased due to insufficient film thickness after sintering. In contrast, if the viscosity thereof is greater than the range, the ink may not be smoothly discharged.

The thus obtained thin film or pattern may be subjected to post treatment such as oxidation or reduction, heat treatment, IR treatment, UV treatment, electron beam treatment, laser treatment, or the like, to thereby form the metal or metal oxide pattern. In the post treatment, the heat treatment may be performed under inert gas atmosphere, or in air, nitrogen or carbon monoxide or in a mixture gas including hydrogen and air or other inert gas, if necessary. The heat treatment may be usually performed at 80~400° C., preferably at 80~300° C., more preferably at 120~250° C., for better physical properties of the film. In addition, the heat treatment may be performed through two steps at a low temperature and a high temperature within the above range for excellent film uniformity. For example, the heat treatment may be performed at 80~150° C. for 3~30 minutes, and then at 150~300° C. for 5~30 minutes.

Hereinafter, the present invention is described in further detail referring to the examples, however, they are for specifically explaining the present invention and thus the present invention is not limited thereto.

Preparative Example 1

Preparation of Silver Complex Compound 3.25 g (10.75 mmol) of 2-ethylhexylammonium 2-ethylhexylcarbamate, a viscous liquid, was dissolved in 10 ml of isopropyl alcohol in a 50 mL Schlenk flask equipped with a stirrer. Then, 1.00 g (4.31 mmol) of silver oxide was added and reaction was performed at room temperature. As the reaction proceeded to produce a complex compound, the reaction mixture started from a black slurry at first, and turned into a light solution and then a transparent solution. The reaction was performed for 2 hours to obtain a colorless transparent solution, which confirmed that the complex compound was successfully obtained. This reaction solution was filtered through a 0.45-micron membrane filter to thereby remove the unreacted silver oxide.

Preparative Example 2

Preparation of Silver Complex Compound 3.72 g (11.61 mmol) of 2-ethylhexylammonium 2-ethylhexylcarbonate, a viscous liquid, was dissolved in a 10 ml of methanol in a 50 mL Schlenk flask equipped with a stirrer. Then, 1.00 g (4.31 mmol) of silver oxide was added and reaction was performed at room temperature. As the reaction proceeded to produce a complex compound, the reaction mixture turned into a black slurry and finally into a light, transparent solution. The reaction was performed for 2 hours to obtain a colorless transparent solution, which confirmed that the complex compound was successfully obtained. The reaction solution was filtered through a 0.45-micron membrane filter and the unreacted silver oxide was removed.

Example 1

1.0 g of acetone oxime was added to 10.0 g of the silver complex compound prepared in preparative example 1 to prepare a silver ink composition. The prepared silver ink composition was spin-coated on a PET film by a spin coater, and then the thin film was sintered at 100° C. for 5 minutes. Thereafter, conductivity (sheet resistance value) of the film was measured, and the measurement results are shown in Table 2.

Example 2

3.0 g of acetone oxime was added to 10.0 g of the silver complex compound prepared in preparative example 1 to prepare a silver ink composition. The prepared silver ink composition was spin-coated on a PET film by a spin coater, and then the thin film was sintered at 100° C. for 5 minutes. Thereafter, conductivity (sheet resistance value) of the film was measured, and the measurement results are shown in Table 2.

Example 3

5.0 g of acetone oxime was added to 10.0 g of the silver complex compound prepared in preparative example 1 to prepare a silver ink composition. The prepared silver ink composition was spin-coated on a PET film by a spin coater, and then the thin film was sintered at 100° C. for 5 minutes. Thereafter, conductivity (sheet resistance value) of the film was measured, and the measurement results are shown in Table 2.

Example 4

The same procedure as example 3 was performed, except that the thin film was sintered at 100° C. for 30 minutes.

Example 5

1.0 g of 2-butanone oxime was added to 10.0 g of the silver complex compound prepared in preparative example 1 to prepare a silver ink composition. The prepared silver ink composition was spin-coated on a PET film by a spin coater, and then the thin film was sintered at 100° C. for 5 minutes. Thereafter, conductivity (sheet resistance value) of the film was measured, and the measurement results are shown in Table 2.

Example 6

3.0 g of 2-butanone oxime was added to 10.0 g of the silver complex compound prepared in preparative example 1 to prepare a silver ink composition. The prepared silver ink composition was spin-coated on a PET film by a spin coater, and then the thin film was sintered at 100° C. for 5 minutes. Thereafter, conductivity (sheet resistance value) of the film was measured, and the measurement results are shown in Table 2.

Example 7

5.0 g of 2-butanone oxime was added to 10.0 g of the silver complex compound prepared in preparative example 1 to prepare a silver ink composition. The prepared silver ink composition was spin-coated on a PET film by a spin coater, and then the thin film was sintered at 100° C. for 5 minutes. Thereafter, conductivity (sheet resistance value) of the film was measured, and the measurement results are shown in Table 2.

Example 8

0.1 g of dimethyl glyoxime was added to 10.0 g of the silver complex compound prepared in preparative example 1 to prepare a silver ink composition. The prepared silver ink composition was spin-coated on a PET film by a spin coater, and then the thin film was sintered at 100° C. for 5 minutes. Thereafter, conductivity (sheet resistance value) of the film was measured, and the measurement results are shown in Table 2.

Example 9

The same procedure as example 3 was performed, except that the thin film was sintered at 80° C. for 60 minutes.

Example 10

The same procedure as example 3 was performed, except that the thin film was sintered at 120° C. for 1 minutes.

Example 11

5.0 g of acetone oxime was added to 10.0 g of the silver complex compound prepared in preparative example 2 to prepare a silver ink composition. The prepared silver ink composition was spin-coated on a PET film by a spin coater, and then the thin film was sintered at 100° C. for 5 minutes. Thereafter, conductivity (sheet resistance value) of the film was measured, and the measurement results are shown in Table 2.

Comparative Example 1

5.0 g of acetone was added to 10.0 g of the silver complex compound prepared in preparative example 1 to prepare a silver ink composition. The prepared silver ink composition was spin-coated on a PET film by a spin coater, and then the thin film was sintered at 100° C. for 5 minutes. Thereafter, conductivity (sheet resistance value) of the film was measured, and the measurement results are shown in Table 2.

Comparative Example 2

5.0 g of 2,3-butanedione was added to 10.0 g of the silver complex compound prepared in preparative example 1 to prepare a silver ink composition. The prepared silver ink composition was spin-coated on a PET film by a spin coater, and then the thin film was sintered at 100° C. for 5 minutes. Thereafter, conductivity (sheet resistance value) of the film was measured, and the measurement results are shown in Table 2.

Comparative Example 3

5.0 g of acetone was added to 10.0 g of the silver complex compound prepared in preparative example 2 to prepare a silver ink composition. The prepared silver ink composition was spin-coated on a PET film by a spin coater, and then the thin film was sintered at 100° C. for 5 minutes. Thereafter, conductivity (sheet resistance value) of the film was measured, and the measurement results are shown in Table 2.

Experimental Example

Test Result 1) conductivity evaluation: After a 1 cm×3 cm square sample was manufactured, and sheet resistance thereof was measured by using CMT-SR1000N (AIT).

2) ink stability evaluation: It was determined whether or not the silver complex compound is reduced for 48 hours or longer after mixing with oxime-based compound or acetone or 2,3-butanedione.

TABLE 2

Physical property data of each silver film prepared by the examples and the comparative examples

| Example | sintering temperature (° C.) | sintering time (min) | sheet resistance (Ω/□) | ink stability |
|---|---|---|---|---|
| Example 1 | 100 | 5 | 11.2 | ◉ |
| Example 2 | 100 | 5 | 7.2 | ◉ |
| Example 3 | 100 | 5 | 6.3 | ◉ |
| Example 4 | 100 | 30 | 0.8 | ◉ |
| Example 5 | 100 | 5 | 30.1 | ◉ |
| Example 6 | 100 | 5 | 4.2 | ◉ |
| Example 7 | 100 | 5 | 3.5 | ◉ |
| Example 8 | 100 | 5 | 7.1 | ◉ |
| Example 9 | 80 | 60 | 6.3 | ◉ |
| Example 10 | 120 | 1 | 2.5 | ◉ |
| Example 11 | 100 | 5 | 8.4 | ◉ |
| Comparative Example 1 | 100 | 5 | 8.2 | Δ |
| Comparative Example 2 | 100 | 5 | 15.8 | X |
| Comparative Example 3 | 100 | 5 | 13.7 | Δ |

◉: excellent,
Δ: normal,
X: bad

As shown in Table 2 as described above, the silver complex compound in examples of the present invention adding the oxime-based compound as the reducing agent, may have excellent stability during ink storage and be sintered at a low temperature, form a compact thin film to provide high electrical conductivity, have a uniform surface to improve reflectance, and decrease the sintering time to improve production efficiency.

The invention claimed is:

1. A silver ink composition comprising
a silver complex compound obtained by reacting at least one silver compound of the following Chemical Formula 1 with at least one ammonium carbamate- or ammonium carbonate-based compound of the following Chemical Formula 2, 3 or 4; and
dimethylglyoxime,
wherein an amount of the dimethylglyoxime is 0.001 to 60 wt % based on 100 wt % of the silver ink composition:

$$Ag_nX \qquad \text{Chemical Formula 1}$$

where n is an integer from 1 to 4, and X is a substituent selected from the group consisting of oxygen, sulfur, halogen, cyano, cyanate, carbonate, nitrate, nitrite, sulfate, phosphate, thiocyanate, chlorate, perchlorate, tetrafluoroborate, acetylacetonate, carboxylate, and derivatives thereof, and

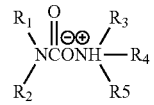

Chemical Formula 2

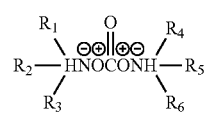

Chemical Formula 3

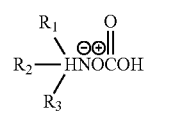

Chemical Formula 4 where $R_1, R_2, R_3, R_4, R_5$ and $R_6$ are the same as or different from each other, and each is a substituent selected from the group consisting of hydrogen; a C1 to C30 aliphatic alkyl group; a C1 to C30 aliphatic aryl group, a C1 to C30 cycloaliphatic alkyl group; a C1 to C30 cycloaliphatic aryl group; a C1 to C30 aralkyl group which is a mixture of C1 to C30 aliphatic alkyl group, a C1 to C30 aliphatic aryl group, a C1 to C30 cycloaliphatic alkyl group, and a C1 to C30 cycloaliphatic aryl group; an alkyl group having a substituted functional group; an aryl group having a substituted functional group; a heterocyclic compound; a polymer compound; and derivatives thereof.

2. The silver ink composition of claim 1, wherein the silver compound of Chemical Formula 1 is at least one selected from the group consisting of silver oxide, silver thiocyanate, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and derivatives thereof.

3. The silver ink composition of claim 1, wherein each of $R_1, R_2, R_3, R_4, R_5$ and $R_6$ is independently selected from the group consisting of hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docosane, cyclopropyl, cyclopentyl, cyclohexyl, allyl, hydroxy, methoxy, methoxyethyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tolyl, benzyl, polyallylamine, polyethyleneimine, and derivatives thereof.

4. The silver ink composition of claim 1, wherein the ammonium carbamate-based compound is selected from the group consisting of ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneimineammonium hexamethyleneiminecarbamate, morpholineammonium morpholinecarbamate, piridinium ethylhexylcarbamate, triethylenediaminium isopropylbicarbamate, benzylammonium benzylcarbamate, triethoxysilylpropylammonium triethoxysilylpropylcarbamate and derivatives thereof.

5. The silver ink composition of claim 1, wherein the ammonium carbonate-based compound is selected from the group consisting of ammonium carbonate, ammonium bicarbonate, ethylammonium ethylcarbonate, isopropylammonium isopropylcarbonate, isopropylammonium bicarbonate, n-butylammonium n-butylcarbonate, isobutylammonium isobutylcarbonate, t-butylammonium t-butylcarbonate, t-butylammonium bicarbonate, 2-ethylhexylammonium 2-ethylhexylcarbonate, 2-ethylhexylammonium bicarbonate, 2-methoxyethylammonium 2-methoxyethylcarbonate, 2-methoxyethylammonium bicarbonate, 2-cyanoethylammonium 2-cyanoethylcarbonate, 2-cyanoethylammonium bicarbonate, octadecylammonium octadecylcarbonate, dibutylammonium dibutylcarbonate, dioctadecylammonium dioctadecylcarbonate, dioctadecylammonium bicarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, piridinium bicarbonate, triethylenediaminium isopropylcarbonate, triethylenediaminium bicarbonate and derivatives thereof.

6. The silver ink composition of claim 1, wherein the silver ink composition includes at least one selected from the group consisting of stabilizer, binder resin, solvent, surfactant, dispersing agent, coupling agent, wetting agent, thixotropic agent, and leveling agent.

7. The silver ink composition of claim 6, wherein the binder resin includes at least one selected from the group consisting of an acryl resin, a cellulose resin, a polyester resin, a polyether resin, a vinyl resin, a urethane resin, an urea resin, an alkyd resin, a silicone resin, a fluorine resin, an olefin resin, petroleum, rosin resin, an epoxy resin, an unsaturated polyester resin, a phenol resin, a melamine based resin, and derivatives thereof.

8. The silver ink composition of claim 6, wherein the solvent includes at least one selected from the group consisting of water, methanol, ethanol, isopropanol, 1-methoxypropanol, butanol, ethylhexyl alcohol, terpineol, ethyleneglycol, glycerine, ethyl acetate, butyl acetate, methoxypropyl acetate, carbitol acetate, ethylcarbitol acetate, methylcellosolve, butylcellosolve, diethylether, tetrahydrofuran, dioxane, methylethylketone, acetone, dimethylformamide, 1-methyl-2-pyrrolidone, dimethylsulfoxide, hexane, heptane, paraffin oil, mineral spirit, toluene, xylene, chloroform, and acetonitrile.

\* \* \* \* \*